US009164589B2

(12) United States Patent
Tong et al.

(10) Patent No.: US 9,164,589 B2
(45) Date of Patent: Oct. 20, 2015

(54) DYNAMIC GESTURE BASED SHORT-RANGE HUMAN-MACHINE INTERACTION

(75) Inventors: Xiaofeng Tong, Beijing (CN); Dayong Ding, Beijing (CN); Wenlong Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 98 days.

(21) Appl. No.: 13/977,248

(22) PCT Filed: Nov. 1, 2011

(86) PCT No.: PCT/CN2011/081656
§ 371 (c)(1),
(2), (4) Date: Jun. 28, 2013

(87) PCT Pub. No.: WO2013/063767
PCT Pub. Date: May 10, 2013

(65) Prior Publication Data
US 2013/0278504 A1    Oct. 24, 2013

(51) Int. Cl.
G09G 5/00 (2006.01)
G06F 3/01 (2006.01)
G06K 9/00 (2006.01)

(52) U.S. Cl.
CPC ............ *G06F 3/017* (2013.01); *G06K 9/00355* (2013.01)

(58) Field of Classification Search
None
See application file for complete search history.

(56) References Cited

U.S. PATENT DOCUMENTS

| 2008/0225041 | A1* | 9/2008 | El Dokor et al. | 345/419 |
| 2010/0169840 | A1* | 7/2010 | Chen et al. | 715/863 |
| 2011/0296353 | A1* | 12/2011 | Ahmed et al. | 715/848 |
| 2012/0281918 | A1* | 11/2012 | Song et al. | 382/170 |

FOREIGN PATENT DOCUMENTS

| CN | 101763515 A | 6/2010 |
| JP | 2004348303 A | 12/2004 |
| WO | 2013063767 A1 | 5/2013 |

OTHER PUBLICATIONS

Bay, et al., "SURF: Speeded Up Robust Features", 2006, 14 Pages.
Elmezain, etal., "A Hidden Markov Model-Based Continuous Gesture Recognition System for Hand Motion Trajectory", Institute for Electronics, Signal Processing and Communications (IESK), IEEE 2008, 4 Pages.
International Search Report and Written opinion for PCT Patent Application No. PCT/CN2011/081656, mailed on Jul. 19, 2012, 10 Pages.
Phu, et al., "Computer Vision Based Hand Gesture Recognition Using Artificial Neural Network", Faculty of Information and Communication Technology, 2005, 6 Pages.

(Continued)

*Primary Examiner* — Joseph Haley
*Assistant Examiner* — Ifedayo Iluyomade
(74) *Attorney, Agent, or Firm* — Lynch Law Patent Group, P.C.

(57) ABSTRACT

Systems, devices and methods are described including starting a gesture recognition engine in response to detecting an initiation gesture and using the gesture recognition engine to determine a hand posture and a hand trajectory in various depth images. The gesture recognition engine may then use the hand posture and the hand trajectory to recognize a dynamic hand gesture and provide corresponding user interface command.

21 Claims, 7 Drawing Sheets

(56) References Cited

OTHER PUBLICATIONS

Ramamoorthy, et al., "Recognition of dynamic hand gestures", Pattern Recognition, Sep. 2003, vol. 36, Issue 9, pp. 2069-2081.

Rosales, et al., "3D Trajectory Recovery for Tracking Multiple Objects and Trajectory Guided Recognition of Actions", Proc. IEEE Conf. on Computer Vision and Pattern Recognition, Jun. 1999, 7 Pages.

* cited by examiner

DYNAMIC GESTURE BASED SHORT-RANGE HUMAN-MACHINE INTERACTION

BACKGROUND

User experience is an important factor in the design of computing products (e.g., smart phones, media tablets, smart televisions, laptop computers, and so forth), and people usually prefer to purchase devices with improved user interfaces (UIs). Given the importance of user experience, many compelling UIs have been incorporated in personal mobile devices and electronic devices in recent years providing human-machine interaction, including, for example, body control, hand/finger gesture, voice command, facial expression, and the like. For example, touch screen UIs provide click, zoom in/out, rotate (two point touch), fling, scroll and the like. Though many existing products provide long-range touch-free gesture control (e.g., game consoles employing body control and the like) or touch-screen gesture control, conventional products do not incorporate short-range touch-free gesture control.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 6, 7 and 8 are flow charts illustrating example dynamic gesture recognition processes.

DETAILED DESCRIPTION

Figure 1:
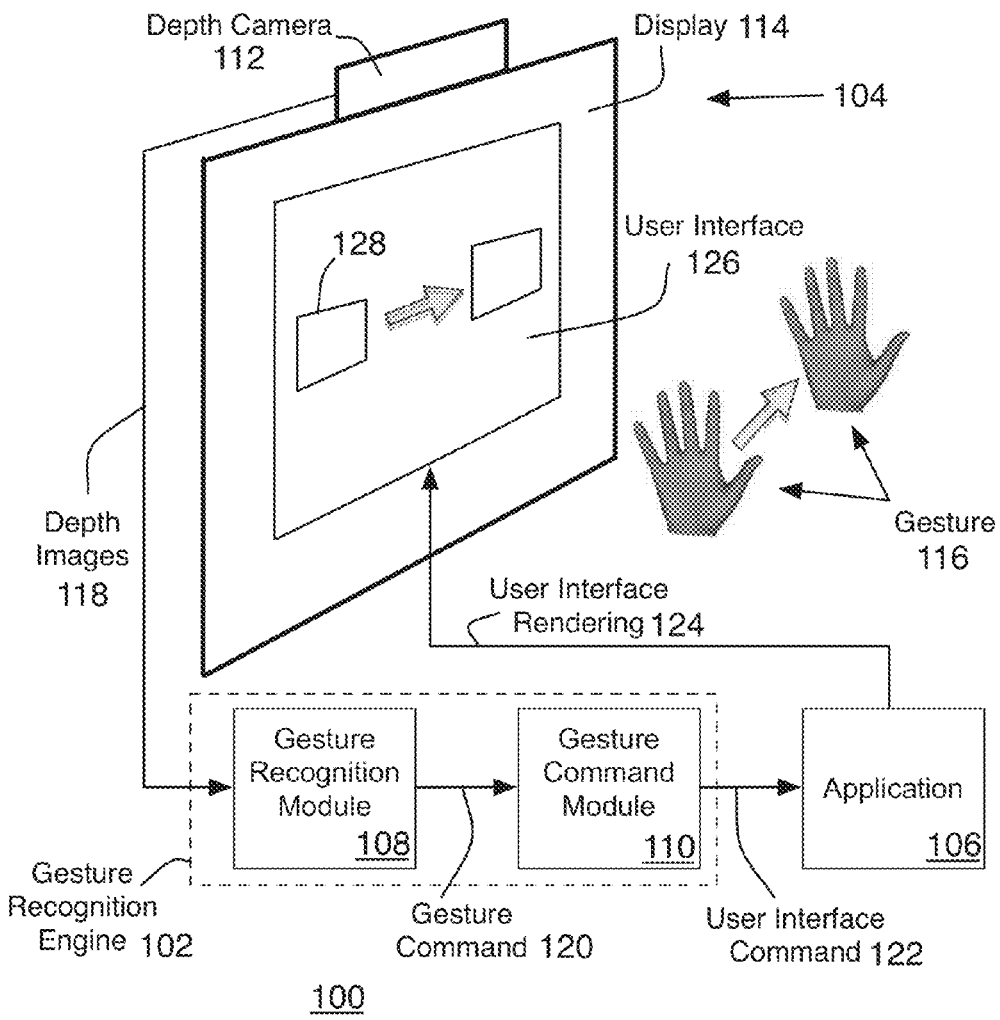
FIG. 1 is an illustrative diagram of an example gesture recognition system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example system 100 in accordance with the present disclosure. In various implementations, system 100 may include a gesture recognition engine 102 communicatively coupled to a display module 104 and a user application 106. Gesture recognition engine 102 includes a gesture recognition module 108 and gesture command module 110. Display module 104 includes a depth camera 112 and a display screen 114.

As will explained in greater detail below, gesture recognition engine 102 may be used to recognize a dynamic hand gesture 116 in response to depth images 118 of gesture 116 that have been captured by camera 112. In particular, gesture recognition module 108 may use techniques to be described in greater detail below to recognize gesture 116 in images 118 and may provide a corresponding gesture command 120 to gesture command module 110. Gesture command module 110 may then convert gesture command 120 into a corresponding user interface (UI) command 122 recognizable by application 106. In response to UI command 122, application 106 may effect a UI rendering 124 such that the gesture command 120 corresponding to gesture 116 acts to, for example, move a UI item 128 from left to right across a UI 126 provided by application 106.

In various implementations, display screen 114 may be a touchscreen display or a non-touchscreen display screen. Further, display screen 114 may be a Liquid Crystal Display (LCD) display screen, an Organic Light Emitting Diode (OLED) display screen, and so forth. In implementations where display screen 114 is a touchscreen display screen, gesture recognition engine 102 may recognize gesture 116 occurring at various positions with respect to display screen 114 including immediately adjacent to display screen 114 (e.g., almost physically touching display screen 114) to a meter or more away from display screen 114. In other implementations, where display screen 114 is a non-touchscreen display screen, gesture recognition engine 102 may recognize gesture 116 occurring anywhere from immediately adjacent to display screen 114, including physically touching display screen 114, to a meter or more away from display screen 114.

In various implementations, camera 112 may be an imaging device capable of capturing still or video depth images such as, but not limited to, a structured light camera, a time-of-flight camera, a stereo depth camera or the like. In various implementations, camera 112 may include one or more Red-Green-Blue-Z (RGB-Z) image sensors (see, e.g., U.S. Pat. Appl. Pub. No. 2005/0285966, entitled Single Chip Red, Green, Blue, Distance (RGB-Z) Sensor). In accordance with the present disclosure, camera 112 may be configured to capture depth images of an environment that includes one or more persons, and may have adequate resolution to capture at least one dynamic gesture performed by one or more persons in the environment.

Images 118 may be monochrome or color depth video images and may have any aspect ratio and/or image resolution. In a few non-limiting examples, images 118 may have a Video Graphics Array (VGA) resolution of 640×480 pixels (e.g., a 4:3 aspect ratio), or a High Definition (HD) resolution of 1280×720 pixels or 1920×1080 pixels (e.g., a 16:9 aspect ratio), and so forth. The present disclosure is not limited to any particular data format, image resolution, image aspect ratio or the like associated with images 118.

As will be explained in greater detail below, in various implementations, gesture 116 may be any type of dynamic hand gesture including one or more hand postures combined with various hand motion trajectories that gesture recognition engine 102 has been trained to recognize. In addition, UI 126 may be any type of UI provided by application 106 and configured such that any dynamic hand gesture recognized by gesture recognition engine 102 may correspond to a UI command 122 recognized by application 106. For instance, UI 126 may have any of a number of well-known UI formats including image browser, cover flow, 3D barrel, visual electronic programming guide (EPG), to name a few non-limiting examples, and gesture 116 may be a move gesture, a zoom-in/out gesture, and/or a rotate gesture as will be explained in greater detail below.

Figure 2:
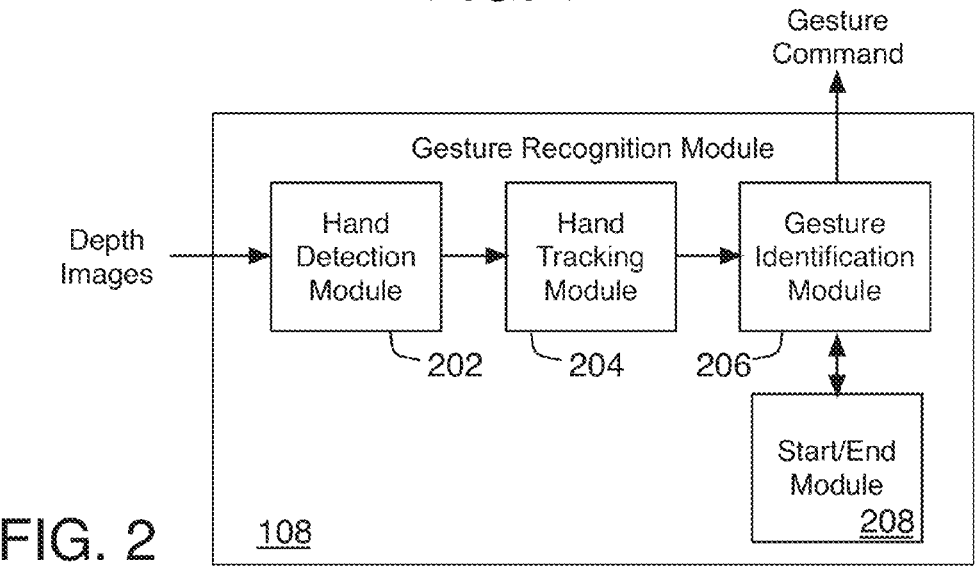
FIG. 2 is an illustrative diagram of a portion of the system of FIG. 1.

FIG. 2 illustrates gesture recognition module 108 of system 100 in greater detail in accordance with the present disclosure. In various implementations, gesture recognition module 108 may include a hand detection module 202 communicatively coupled to a hand tracking module 204, a gesture identification module 206 communicatively coupled to hand tracking module 204, and a start/end module 208 communicatively coupled to gesture identification module 206.

Figure 3:
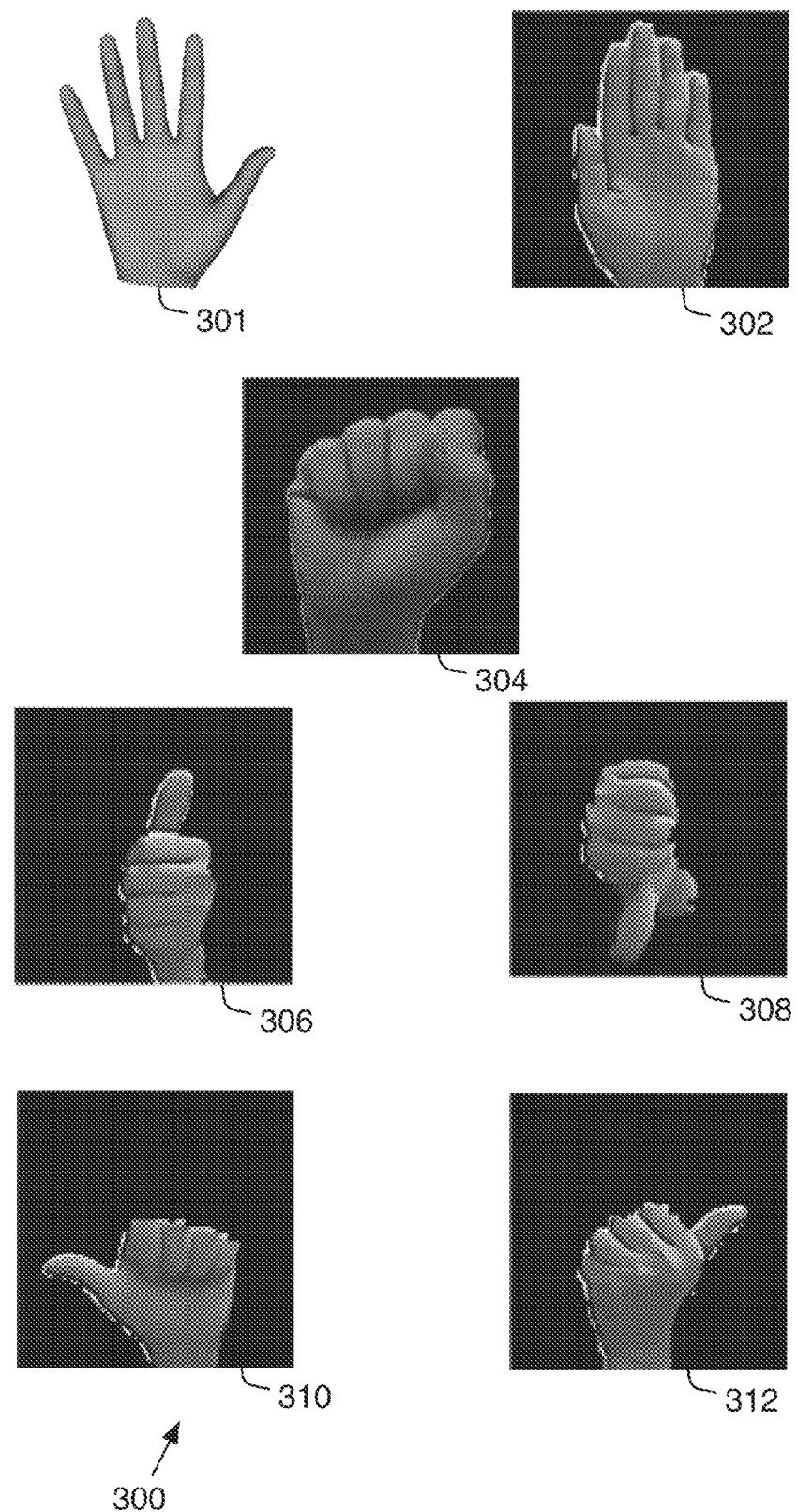
FIG. 3 illustrates example hand postures.

In various implementations, hand detection module 202 may be configured to receive depth images 118 from camera 112 and to detect at least one hand when the hand appears within the view of camera 112 at a particular range of depth values (e.g., when a hand is within one meter of camera 112), or when a hand is lost during subsequent hand tracking. In various implementations, criterion for hand detection module 202 to detect a hand may include the appearance of a hand within a certain depth threshold (e.g., less than one meter) in front of display 114 where the hand is in a closed posture. For example, FIG. 3 depicts various example hand postures 300 in accordance with the present disclosure including an open posture 301, a closed posture 302, a fist posture 304, a thumb-up posture 306, a thumb-down posture 308, a thumb-left posture 310, and a thumb-right posture 312. Of course, images 300 are only examples of the types of hand postures in accordance with the present disclosure, and these examples are not intended to be an exhaustive list of the types of hand postures that may be used in accordance with the present disclosure.

In accordance with the present disclosure, hand detection module 202 may include hand detection code (or instruction sets) that are generally operable to receive a standard format depth image (e.g., an RGB color depth image) and identify, at least to a certain extent, a hand in the image. Such known hand detection systems include computer vision systems for object recognition, 3-D reconstruction systems, 2D Haar wavelet response systems (and derivatives thereof), skin-color based method, shape-based detection, facial recognition schemes (and extension and/or derivatives thereof), and so forth. In various implementations, hand detection module 202 may employ Speed-Up Robust Features (SURF) recognition techniques (see, e.g., Bay et al., "Surf: Speeded up robust features," Computer Vision and Image Understanding (CVIU), 110(3), pages 346-359, 2008) to define a hand region in a depth image.

In accordance with the present disclosure, hand tracking module 204 may be generally configured to track a hand region (defined by hand detection module 202) through a sequence of depth images (e.g., a sequence of video frames captured by camera 112 at 24 frames per second) and to record the corresponding hand trajectory. I-Land tracking module 204 may include hand tracking code (or instruction sets) that are generally operable to receive a series of images (e.g., RGB color-depth images) and track, at least to a certain extent, the motion of a hand region in the series of images. Such known tracking systems include particle filtering, optical flow, Kalman filtering, etc., each of which may utilize edge analysis, sum-of-square-difference analysis, feature point analysis, and the like.

In various implementations, when hand tracking is undertaken by hand tracking module 204, a hand icon (not shown in FIG. 1) may be depicted on display screen 114 to inform a user of system 100 of the status of hand tracking (e.g., the icon may disappear or be altered to indicate that hand tracking has been lost). If hand tracking is lost, a user may push his/her hand forward with closed posture 302 to re-initiate hand tracking using hand detection module 202 to detect the user's hand.

In various implementations, hand tracking module 204 may utilize hue-saturation-depth (HSD) histograms as an image feature and employ mean-shift analysis techniques to track a moving hand. Using these techniques, hand tracking module 204 may generate information including a hand's bounding box, center-point, motion history and/or observation states.

In various implementations, mean-shift analysis employed by hand tracking module 204 may use gradients of probabilistic density to iteratively obtain the center of density of an object (e.g., a hand) being tracked. In each iteration, object position may be updated using the following formula, and may continue until convergence:

$$x' = \frac{\sum_{(x,y) \in ROI} p(x, y, z)x}{\sum_{(x,y) \in ROI} p(x, y, z)} \quad \text{Eq(1)}$$

$$y' = \frac{\sum_{(x,y) \in ROI} p(x, y, z)y}{\sum_{(x,y) \in ROI} p(x, y, z)} \quad \text{Eq(2)}$$

$$z' = \frac{\sum_{(x,y) \in ROI} p(x, y, z)z}{\sum_{(x,y) \in ROI} p(x, y, z)} \quad \text{Eq(3)}$$

where p(x,y,z) represents the correlation between the model's HSD histogram and the image observation HSD histogram at the point (x,y,z). In some implementations, the original image (received from hand detection module 202) may be converted into another color space (e.g., hue-saturation-value (HSV)) so that color histogram information may be more readily extracted.

In various implementations, hand tracking module 204 may implement skin segmentation techniques to identify the skin colors of a hand within a hand region of an image (defined by the hand detection module 202). To do so, hand tracking module 204 may include skin color identification code (or instruction sets) that are generally operable to distinguish skin tones or colors from other areas of the hand region. Such known skin identification systems include thresholding on hue-saturation color components, HSV color statistics, color-texture modeling, and the like. For example, in some implementations, hand tracking module 204 may use a generalized statistical skin color model, such as a multi-variable Gaussian model to identify portions of an image that correspond to a hand. In other implementations, hand tracking module 204 may be configured to use depth information associated with pixels in a depth image to identify (segment) a hand within a depth image.

Figure 4:
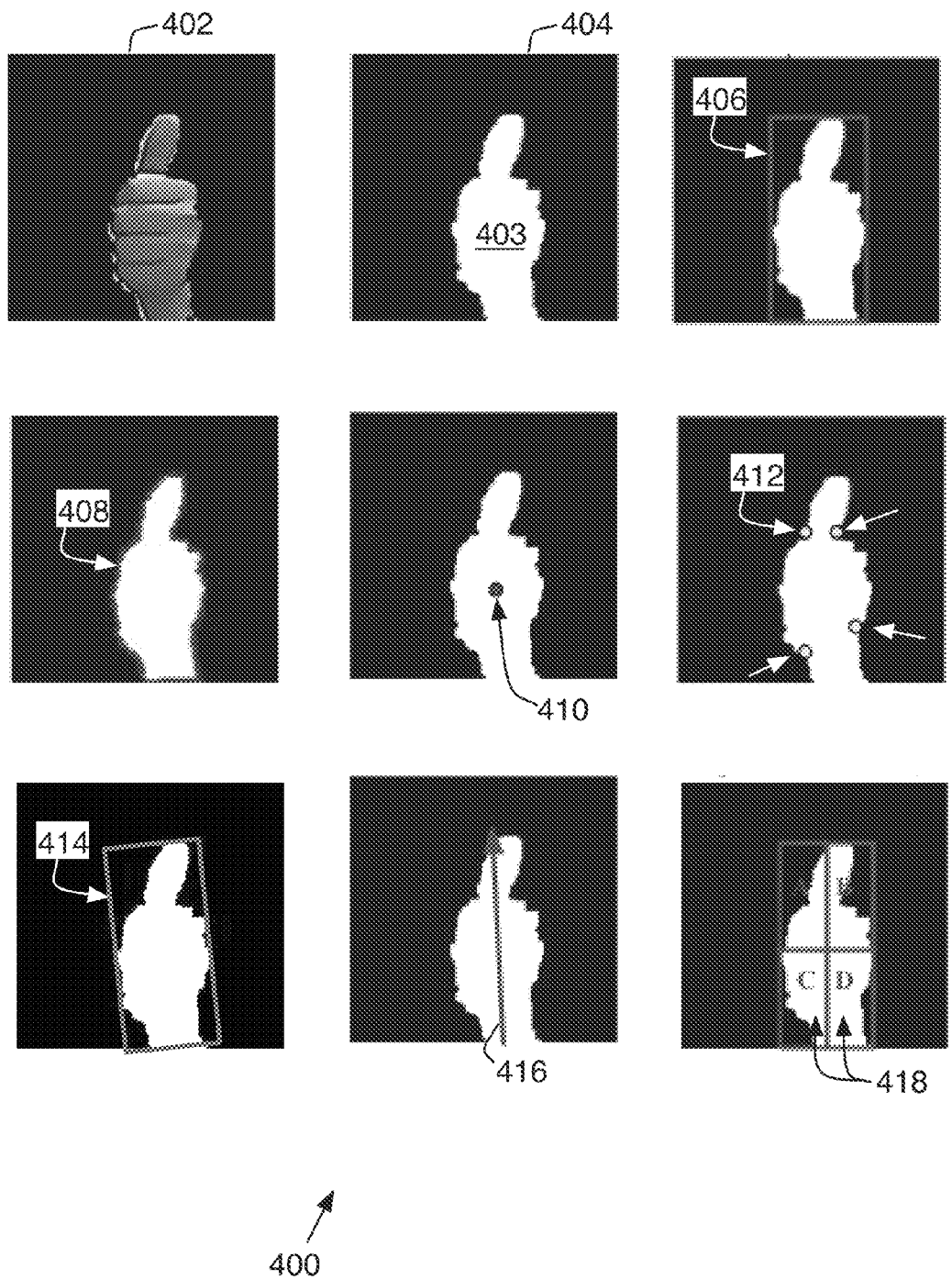
FIG. 4 illustrates several example images and corresponding shape features.

In addition to the information specifying a hand's bounding box, center-point, motion history and/or observation states, hand tracking module 204 may generate a binary version of a depth image (or a portion thereof) where, for example, pixels corresponding to a hand are assigned a binary value of 1 (e.g., white) and the remaining pixels are assigned a binary value of 0 (e.g., black). For instance, FIG. 4 depicts various example images 400 in accordance with the present disclosure including items that may be generated by hand tracking module 204. As shown in the example of FIG. 4, for an input RGB image including a hand region 402 (as may be generated by hand detection module 202), hand tracking module 204 may generate a binary segmented image 404 including a bounding box 406 surrounding an segmented hand portion 403. Although depicted as rectangular in FIG. 4, in various implementations, bounding box 406 may be various shapes include a circle, oval, square and/or other regular or irregular shape, depending on, for example, the geometry of hand portion 403 appearing in image 404.

Gesture recognition module 108 may also include gesture identification module 206 generally configured to identify one or more shape features of the hand in the binary image generated by hand tracking module 204 and to use those shape features and the motion trajectory information provided by hand tracking module 204 to identify dynamic hand gestures in accordance with the present disclosure.

The shape features identified by gesture identification module 206 may generally include intrinsic properties and/or "markers" of the hand shape in the binary image, and may be used to identify a hand gesture in the image. Shape features may include, for example, eccentricity, compactness, orientation, rectangularity, width center, height center, minimum box angle, minimum box width, the number of defects, the difference between left and right portions of a bounding box, and/or the difference between top and bottom portions of a bounding box. As a result, gesture identification module 206 may specify an 11-dimensional shape feature associated with hand region 403.

As shown in FIG. 4 and based on bounding box 406, gesture identification module 206 may be configured to determine the eccentricity, rectangularity, compactness and center of hand region 403 within bounding box 406, and also determine the area of hand region 403 as a count of the white pixels in bounding box 406 and the contour or perimeter 408 of hand region 403 as a count of those white pixels at the edge of hand region 403 (e.g., white pixels in bounding box 406 that are directly next to black pixels). Eccentricity may be determined as the width of bounding box 406 times the height of bounding box 406; rectangularity may be determined as the area of hand region 403 divided by the area of bounding box 406; and compactness may be determined as the square of perimeter 408 divided by the area of hand region 403. In addition, gesture identification module 206 may be configured to determine the center 410 of hand region 403 where center 410 may be determined as the middle of bounding box 406 along both a horizontal axis (e.g., x-axis) and a vertical axis (e.g., y-axis).

Gesture identification module 206 may also be configured to determine the number of defects 412 appearing along contour 408. Defects 412 may be defined as local defect of convexity, e.g., the pixel locations where a concave region has one or more convex pixels. Gesture identification module 206 may also be configured to determine a minimum shape 414 enclosing contour 408. The minimum shape (a rectangle or "minimum box" in this example) may be defined by the left-most, right-most, highest and lowest white pixels in the image, and, as depicted, may be slanted with respect to the axes of the image. The angle of minimum shape 414 with respect to the horizontal axis of image 404 may be determined by gesture identification module 206 and may be used to determine the orientation 416 of hand region 403 within image 404. As depicted herein, orientation 416 may be defined as line taken from the center of, and normal to, the width of minimum shape 414. In addition, gesture identification module 206 may determine the width to height ratio of minimum shape 414 defined as minimum shape 414 width divided by minimum shape 414 height.

Gesture identification module 206 may also be configured to divide bounding box 406 into a plurality of substantially equal segments 418, as depicted in FIG. 4. In this example, bounding box 406 is divided into four equal rectangular sub-blocks, labeled A, B, C and D. Based on segments 418, gesture identification module 206 may also be configured to determine the number of white pixels in each segment 418, the difference between the number of white pixels in the left and right segments of the image (e.g., (A+C)−(B+D)), and the difference between the number of white pixels in the top and bottom segments of the image (e.g., (A+B)−(C+D)).

Table 1 sets forth the eleven example feature components described above:

TABLE 1

Example Feature Components

| Feature | Obtained from: |
|---|---|
| eccentricity | bounding box width/bounding box height |
| rectangularity | area/(bounding box width * bounding box height) |
| compactness | (perimeter * perimeter)/area |
| orientation | obtained from moments of segmented binary image |
| cent_x | center_x/bounding box width |
| cent_y | center_y/bounding box height |
| defect_num | number of defects in segmented binary image |
| minBox_angle | angle of long axis of minimum box |
| minBox_width_height_ratio | minimum box width/minimum box height |
| left_right_difference | (A + C) − (B + D) |
| up_down_difference | (A + B) − (C + D) |

The foregoing examples of the operations of gesture identification module 206 and the described shape features are not intended to be an exhaustive list, nor would all the shape features described above be useful or necessary in determining a hand posture in an image. Thus, in some implementations and for other hand postures, additional shape features may be determined or a subset of the described shape features may be determined.

In various implementations, in response to identifying shape features as described above, gesture identification module 206 may perform various recognition techniques to classify a hand's posture (e.g., as open posture 301, closed posture 302, fist posture 304 and so forth of FIG. 3). To do so, gesture identification module 206 may include posture recognition code (or instruction sets) that are generally operable to identify a hand posture in an image. Known recognition techniques that may be used according to the teachings of the present disclosure include, for example, pattern recognition systems, Perseus models (and derivatives thereof), Hidden Markov models (and derivatives thereof), support vector machine, linear discriminate analysis, decision tree, and the like.

For instance, in various implementations, gesture identification module 206 may use well-known artificial neural multi-layer perceptron (MLP) analysis techniques to recognize hand postures based on the 11-dimensional shape feature described above. For example, MLP analysis employed by gesture identification module 206 may iteratively map one or more inputs onto one or more outputs using a feedforward neural network that improves on a standard linear preceptron model by distinguishing data that is not linearly separable. In this example, the inputs to the MLP model may include one or more shape features generated by gesture identification module 206 where each shape feature corresponds to an input node of the neural network.

In various implementations, subsequent to determining hand posture, gesture identification module 206 may recognize a dynamic hand gesture based on the identified hand posture in combination with hand motion trajectory information provided by hand tracking module 204. To do so, gesture identification module 206 may employ motion energy techniques (see, e.g., R. Rosales and S. Sclaroff, "3D Trajectory Recovery for Tracking Multiple Objects and Trajectory Guided Recognition of Actions", Proc. IEEE Conf. on Computer Vision and Pattern Recognition (June 1999)) to find temporal segment points, and then may apply hidden-markov-model (HMM) techniques (see, e.g., M. Elmezain et al., "A Hidden Markov Model-Based Continuous Gesture Recognition System for Hand Motion Trajectory", 19th International Conference on Pattern Recognition (ICPR), pages 1-4 (2008)) to determine a hand's trajectory. Gesture identification module 206 may then determine, based on the hand posture and trajectory, which type of pre-defined dynamic hand gesture the identified dynamic hand gesture corresponds to, if any.

In various implementations, when performing HMM techniques to recognize a dynamic gesture, gesture identification module 206 may determine a motion feature based on a video sequence containing N image frames, where, for each frame, a 6-dimension motion feature $\{dx_t, dy_t, dz_t, \Sigma dx_t, \Sigma dy_t, \Sigma dz_t\}$ may be determined where t is the time stamp in the sequence; $dx_t$, $dy_t$, and $dz_t$ are the differences in position between a current time stamp and a previous time stamp; and $\Sigma dx_t$, $\Sigma dy_t$, and $\Sigma dz_t$ are the accumulated differences in position between a current time stamp and a starting time stamp. In various implementations, for each HMM model, five states may be set in addition to two non-emitting states (e.g., corresponding to the initial and final states), and a ten Gaussian mixture in addition to a left-right connection structure may be applied. In various implementations, a threshold may also be applied to reject detected dynamic hand gestures not belonging to any pre-defined types. Thus, for an optimal class label with the optimal likelihood ρ, if ρ is smaller than a threshold τ, the detected dynamic gesture may be rejected as an illegal gesture as being not one of a pre-defined type.

Figure 5:
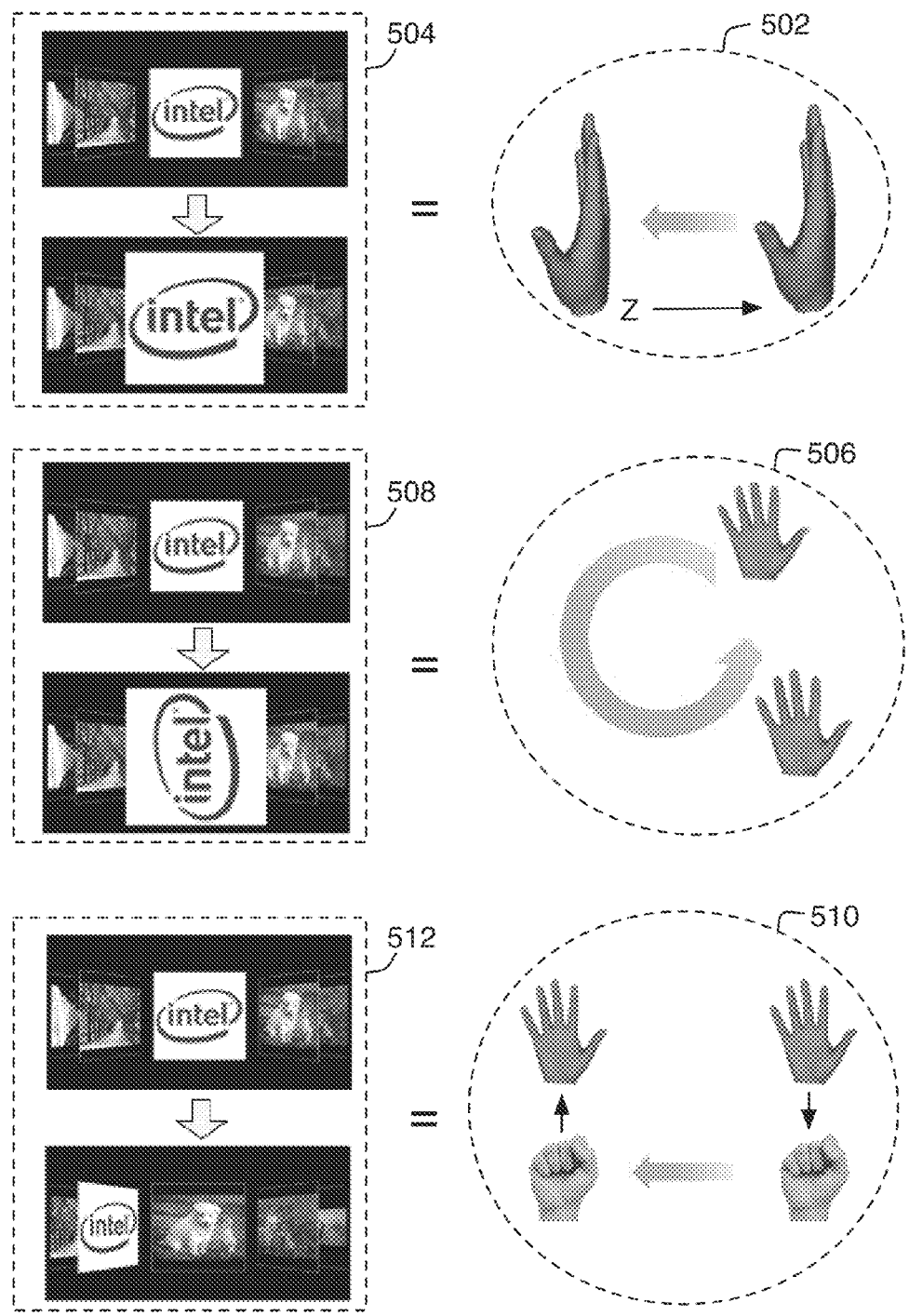
FIG. 5 illustrates example dynamic hand gestures.

For each detected dynamic gesture that exceeds the threshold, gesture identification module 206 may compare the dynamic hand gesture's hand posture and motion feature to a database of hand postures and motion features of pre-defined dynamic hand gestures. For example, FIG. 5 depicts various pre-defined dynamic hand gestures 500 and corresponding UI commands in accordance with the present disclosure that may be identified by gesture identification module 206. As shown in the example of FIG. 5, pre-defined dynamic hand gestures in accordance with the present disclosure include: a zoom-in/out gesture 502 including the motion forward or backward in the z/depth direction of a hand in an open or closed posture which may be recognized as corresponding to a zoom-in/out command 504; a rotate gesture 506 including clockwise or counter-clockwise motion of a hand in an open or closed posture which may be recognized as corresponding to a rotate command 508; and a move gesture 510 including a hand changing posture from open or closed to a fist at a location and then moving to another location while maintaining a fist posture, before restoring hand posture to open or closed which may be recognized as corresponding to a move command 512.

Although not depicted in FIG. 5, additional hand gestures recognized by gesture identification module 206 may include, but are no limited to, a click gesture where a hand in open or closed posture maintains position statically for a pre-defined interval (e.g., three seconds). Further, gesture identification module 206 may be generally configured to recognize a pre-defined start or initiation hand gesture that may be used by start/end module 208 to initiate operation of gesture recognition engine 102 so that gesture identification module 206 provides gesture commands 120 in response to the recognition of dynamic hand gestures in accordance with the present disclosure. For instance, similar to the click gesture, a start or initiation gesture may include a hand in open or closed posture maintaining position statically for a pre-defined interval (e.g., three seconds). In various implementations, upon recognition of an initiation gesture, gesture recognition engine 102 may begin to track hands in each successive frame to identify hand posture, record the motion trajectory, recognize the corresponding dynamic hand gesture, and provide a corresponding UI command 112 to application 106. In other implementations, gesture recognition engine 102 may detect hands in a specified time interval (e.g., three seconds) instead of every frame.

Gesture recognition engine 102 may also be generally configured to recognize a pre-defined end or termination gesture that may be used by start/end module 208 to end or suspend operation of gesture recognition module 108. For instance, a pre-defined termination gesture may include two hands placed across each other. In various implementations, after detecting and recognizing a stop gesture, gesture recognition module 108 may remain in a sleep mode until a subsequent initiation gesture is detected.

The gesture command output of gesture recognition module 108 may include a signal or data set indicative of the type of dynamic hand gesture identified. This, in turn may be used by gesture command module 110 to generate UI command 122 that may be recognized by application 106 to effect the corresponding UI action such as zoom-in/out, rotate, move and so forth.

Figure 6:
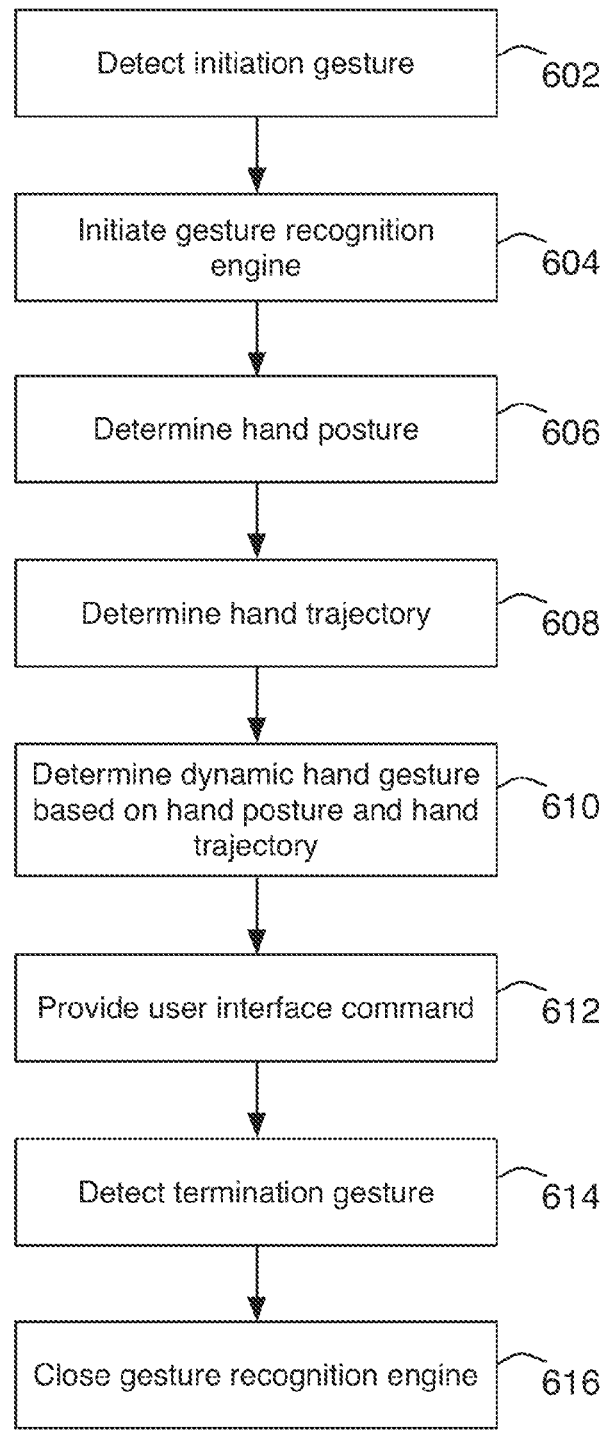
FIG. 6 is a flow chart of an example head detection process.

FIG. 6 illustrates a flow diagram of an example process 600 for dynamic gesture recognition according to various implementations of the present disclosure. Process 600 may include one or more operations, functions or actions as illustrated by one or more of blocks 602, 604, 606, 608, 610, 612, 614 and 616 of FIG. 6. By way of non-limiting example, process 600 will be described herein with reference to example system 100 of FIGS. 1 and 2.

Process 600 may begin with the detection of an initiation gesture at block 602 followed by the initiation of a gesture recognition engine at block 604. For example, as described previously, gesture recognition module 108 may detect an initiation gesture at block 602 and start/stop module 208 may, as a result, initiate operation of gesture recognition engine 102 to subsequently recognize one or more dynamic hand gestures as described herein.

Figure 7:
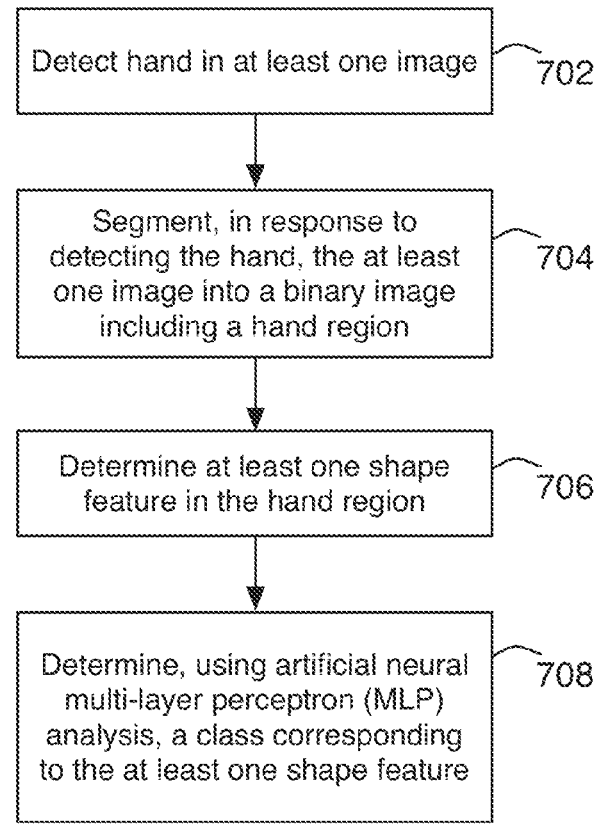

At block 606, a hand posture may be determined. For instance, as described previously, once gesture recognition engine 102 has been initiated, gesture recognition module 108 may undertake block 606 as described herein. For instance, FIG. 7 illustrates a flow diagram of an example process 700 for determining hand posture according to various implementations of the present disclosure. Process 700 may include one or more operations, functions or actions as illustrated by one or more of blocks 702, 704, 706 and 708 of FIG. 7. By way of non-limiting example, process 700 will be described herein with reference to example system 100 of FIGS. 1 and 2.

Process 700 may begin with the detection of a hand in at least one image at block 702 followed by, in response to detection of a hand, the segmentation of that image into a binary including a hand region at block 704. For instance, as described previously, hand detection module 202 may undertake block 702 and hand tracking module 204 may undertake block 704. At block 706, at least one shape feature may be determined in the hand region, and, at block 708, a class corresponding to the at least one shape feature may be determined using artificial neural MLP analysis. For instance, as described previously, gesture identification module 206 may undertake block 706 by identifying shape features as depicted in the example of FIG. 4 including at least one of eccentricity, compactness, orientation, rectangularity, width center, height center, minimum box angle, minimum box width, number of defects, difference between left and right portions, and/or difference between top and bottom portions. Gesture identification module 206 may then undertake block 708 using MLP analysis to classify the shape feature(s).

Figure 8:
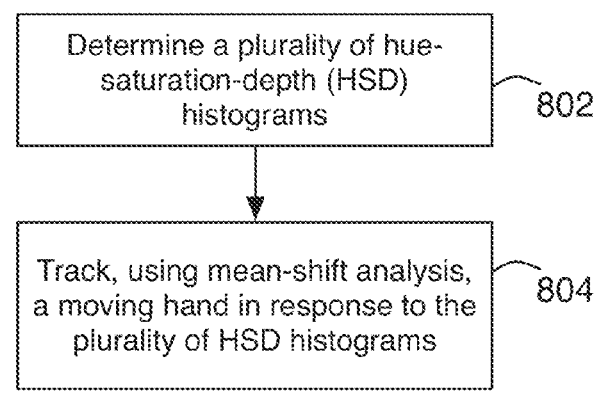

Returning to the discussion of FIG. 6, process 600 may continue at block 608 where a hand trajectory may be determined. For instance, as described previously, gesture recognition module 108 may undertake block 608. For instance, FIG. 8 illustrates a flow diagram of an example process 800 for determining a hand trajectory according to various implementations of the present disclosure. Process 800 may include one or more operations, functions or actions as illustrated by one or more of blocks 802 and 804 of FIG. 8. By way of non-limiting example, process 800 will be described herein with reference to example system 100 of FIGS. 1 and 2.

Process 800 may begin with the determination of multiple HSD histograms at block 802. Process 800 may then conclude at block 804 where a moving hand may be tracked using mean-shift analysis in response to the multiple HSD histograms. For instance, as described previously, gesture identification module 206 may undertake blocks 802 and 804.

Returning to the discussion of FIG. 6, process 600 may continue at block 610 where a dynamic hand gesture may be determined based on the hand posture and hand trajectory provided at blocks 606 and 608, respectively. For instance, as described previously, gesture identification module 206 may undertake block 610 using an HMM to identify the dynamic hand gesture (e.g., a move, zoom-in/out, or rotate gesture as depicted in FIG. 5) and generate a corresponding gesture command 120. At block 612, a user interface command may be provided in response to determining the dynamic hand gesture. For instance, as described previously, gesture command module 110 may undertake block 612 by providing a UI command 122 to application 106 where UI command 122 corresponds to the specific dynamic hand gesture determined at block 610.

Process 600 may then conclude at block 614 where a termination gesture may be detected and, in response, the gesture recognition engine may be closed at block 616. For example, as described previously, gesture recognition module 108 may detect a termination gesture at block 614 and start/stop module 208 may, as a result, terminate operation of gesture recognition engine 102 at block 616.

While implementation of example processes 600, 700 and 800, as illustrated in FIGS. 6, 7 and 8, may include the undertaking of all blocks shown in the order illustrated, the present disclosure is not limited in this regard and, in various examples, implementation of processes 600, 700 and 800 may include the undertaking only a subset of the blocks shown and/or in a different order than illustrated.

In addition, any one or more of the blocks of FIGS. 6, 7 and 8 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 6, 7 and 8 in response to instructions conveyed to the processor by a computer readable medium.

While the foregoing examples and implementations described the images captured by camera 112 as RGB images, other color spaces may be used consistent with the teachings herein. For example, YUV, grayscale, infrared, xyz, uvw, Luv Lab, and/or other known or after-developed color space specifications may be used.

As used in any implementation described herein, the term "module" and/or "engine" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
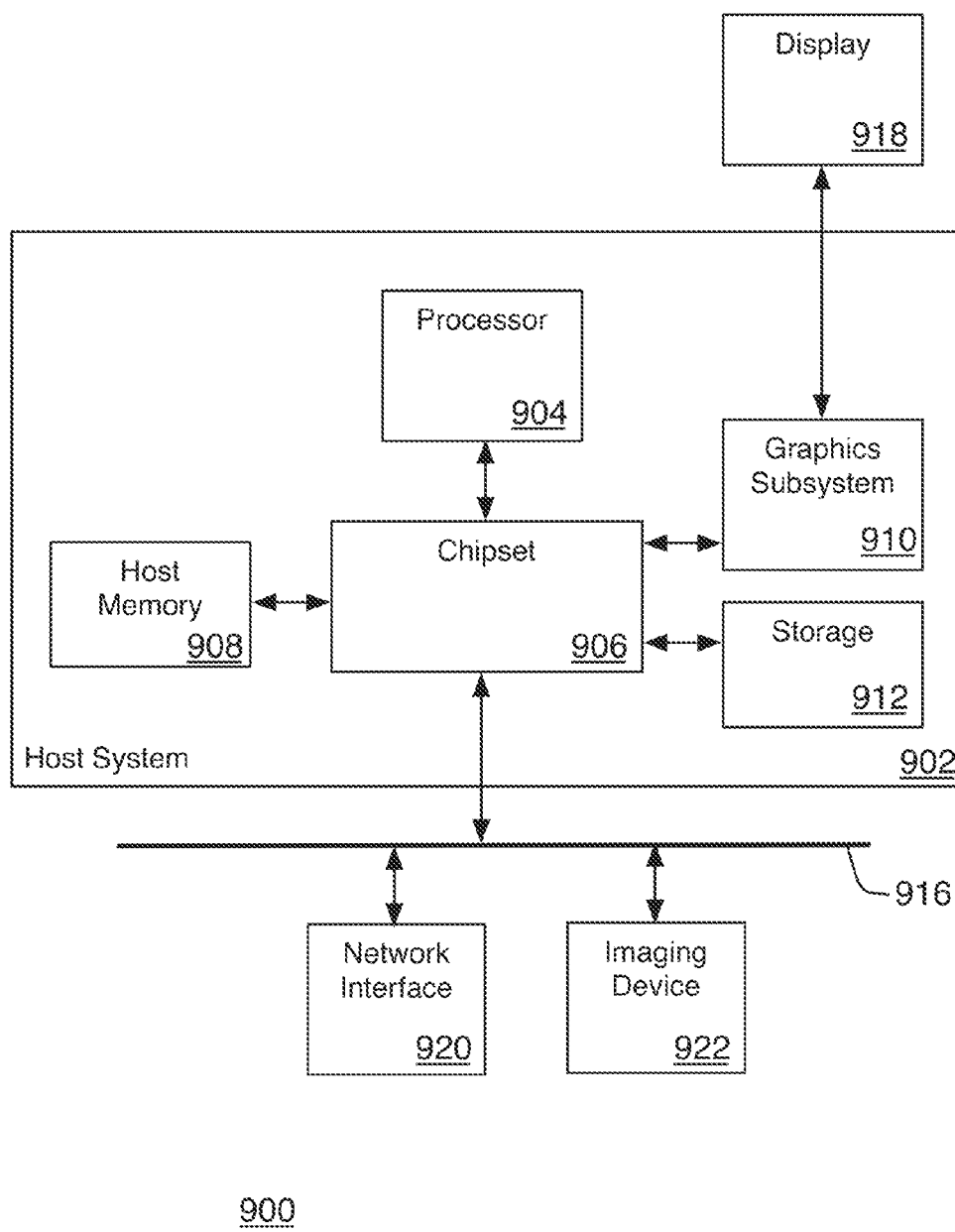
FIG. 9 is an illustrative diagram of an example system, all arranged in accordance with at least some implementations of the present disclosure.

FIG. 9 illustrates an example computing system 900 in accordance with the present disclosure. System 900 may be used to perform some or all of the various functions discussed herein and may include any device or collection of devices capable of undertaking processes described herein in accordance with various implementations of the present disclosure. For example, system 900 may include selected components of a computing platform or device such as a desktop, mobile or tablet computer, a smart phone, a set top box, etc., although the present disclosure is not limited in this regard. In some implementations, system 900 may include a computing platform or SoC based on Intel® architecture (IA) in, for example, a CE device. It will be readily appreciated by one of skill in the art that the implementations described herein can be used with alternative processing systems without departure from the scope of the present disclosure.

Computing system 900 may include a host system 902, a bus 916, a display 918, a network interface 920, and an imaging device 922. Host system 902 may include a processor 904, a chipset 906, host memory 908, a graphics subsystem 910, and storage 912. Processor 904 may include one or more processor cores and may be any type of processor logic capable of executing software instructions and/or processing data signals. In various examples, processor 904 may include Complex Instruction Set Computer (CISC) processor cores, Reduced Instruction Set Computer (RISC) microprocessor cores, Very Long Instruction Word (VLIW) microprocessor cores, and/or any number of processor cores implementing any combination or types of instruction sets. In some implementations, processor 904 may be capable of digital signal processing and/or microcontroller processing.

Processor 904 may include decoder logic that may be used for decoding instructions received by, e.g., chipset 906 and/or a graphics subsystem 910, into control signals and/or microcode entry points. Further, in response to control signals and/or microcode entry points, chipset 906 and/or graphics subsystem 910 may perform corresponding operations. In various implementations, processor 904 may be configured to undertake any of the processes described herein including the example processes described with respect to FIGS. 6, 7 and 8. In various implementations, the execution of code and/or an instruction set or instructions by processor 904 may provide gesture recognition engine 102 of system 100.

Chipset 906 may provide intercommunication among processor 904, host memory 908, storage 912, graphics subsystem 910, and bus 916. For example, chipset 906 may include a storage adapter (not depicted) capable of providing intercommunication with storage 912. For example, the storage adapter may be capable of communicating with storage 912 in conformance with any of a number of protocols, including, but not limited to, the Small Computer Systems Interface (SCSI), Fibre Channel (FC), and/or Serial Advanced Technology Attachment (S-ATA) protocols. In various implementations, chipset 906 may include logic capable of transferring information within host memory 908, or between network interface 920 and host memory 908, or in general between any set of components in system 900. In various implementations, chipset 906 may include more than one IC.

Host memory 908 may be implemented as a volatile memory device such as but not limited to a Random Access Memory (RAM), Dynamic Random Access Memory (DRAM), or Static RAM (SRAM) and so forth. Storage 912 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device or the like.

Memory 908 may store instructions and/or data represented by data signals that may be executed by processor 904 in undertaking any of the processes described herein including the example process described with respect to FIGS. 6, 7 and 8. For example, host memory 908 may store data corresponding to shape features, hand postures and hand trajectories of pre-defined dynamic gestures and so forth. In some implementations, storage 912 may also store such items.

Graphics subsystem 910 may perform processing of images such as still or video images for display. For example, in some implementations, graphics subsystem 910 may perform video encoding or decoding of an input video signal. An analog or digital interface may be used to communicatively couple graphics subsystem 910 and display 918. For example, the interface may be any of a High-Definition Multimedia Interface, DisplayPort, wireless HDMI, and/or wireless HID compliant techniques. In various implementations, graphics subsystem 910 may be integrated into processor 904 or chipset 906. In some other implementations, graphics subsystem 910 may be a stand-alone card communicatively coupled to chipset 906.

Bus 916 may provide intercommunication among at least host system 902, network interface 920, imaging device 922 as well as other peripheral devices (not depicted) such as a keyboard, mouse, and the like. Bus 916 may support serial or parallel communications. Bus 916 may support rode-to-node or node-to-multi-node communications. Bus 916 may at least be compatible with the Peripheral Component Interconnect (PCI) specification described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network interface 920 may be capable of providing intercommunication between host system 902 and a network (not shown) in compliance with any applicable protocols such as wired or wireless techniques. For example, network interface 920 may comply with any variety of IEEE communications standards such as 802.3, 802.11, or 802.16. Network interface 920 may intercommunicate with host system 902 using bus 916. In some implementations, network interface 920 may be integrated into chipset 906.

Display 918 may be any type of display device and/or panel. For example, display 918 may be a Liquid Crystal Display (LCD), a Plasma Display Panel (PDP), an Organic Light Emitting Diode (OLED) display, and so forth. In some implementations, display 918 may be a projection display (such as a pico projector display or the like), a micro display, etc. In various implementations, display 918 may be used to display a UI performing actions as specified by dynamic hand gestures recognized by the techniques described herein. In various implementations, display 918 may correspond to display module 104 of system 100.

Imaging device 922 may be any type of imaging device such as a digital camera, cell phone camera, infra red (IR) camera, and the like. Imaging device 922 may include one or more image sensors (such as a Charge-Coupled Device (CCD) or Complimentary Metal-Oxide Semiconductor (CMOS) image sensor). Imaging device 922 may capture color or monochrome depth images. In various implementations, imaging device 922 may correspond to camera 112 of system 100 and may capture depth images and provide those depth images, via bus 916 and chipset 906, to processor 904 for dynamic hand gesture recognition processing as described herein.

In some implementations, system 900 may communicate with various I/O devices not shown in FIG. 9 via an I/O bus (also not shown). Such I/O devices may include but are not limited to, for example, a universal asynchronous receiver/transmitter (UART) device, a USB device, an I/O expansion interface or other I/O devices. In various implementations, system 900 may represent at least portions of a system for undertaking mobile, network and/or wireless communications.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method for recognizing a dynamic hand gesture, comprising:
   detecting an initiation gesture;
   starting a gesture recognition engine in response to detecting the initiation gesture;
   determining, using the gesture recognition engine, a hand posture in at least one image of a plurality of images;
   determining, using the gesture recognition engine, a hand trajectory in the plurality of images;
   determining, using the gesture recognition engine, a dynamic hand gesture in response to the hand posture and the hand trajectory;
   providing, using the gesture recognition engine, a user interface command in response to determining the dynamic hand gesture
   wherein determining the hand trajectory comprises:
      determining a plurality of hue-saturation-depth (HSD) histograms; and
      tracking, using mean-shift analysis, a moving hand in response to the plurality of HSD histograms.

2. The method of claim 1, wherein determining the hand posture comprises:
   detecting a hand in the at least one image;
   segmenting, in response to detecting the hand, the at least one image into a binary image including a hand region; and
   determining at least one shape feature in the hand region.

3. The method of claim 2, further comprising:
   determining, using artificial neural multi-layer perceptron (MLP) analysis, a class corresponding to the at least one shape feature.

4. The method of claim 2, wherein the a least one shape feature comprises at least one of eccentricity, compactness, orientation, rectangularity, width center, height center, minimum box angle, minimum box width, number of defects, difference between left and right portions, or difference between top and bottom portions shape features.

5. The method of claim 2, wherein detecting the hand comprises using a cascade speeded-up robust feature (SURF) detector to detect the hand.

6. The method of claim 1, wherein determining the dynamic hand gesture comprises applying a hidden-markov model (HMM) to identify the dynamic hand gesture.

7. A non-transitory computer-readable storage medium comprising a computer program product having stored therein instructions that, if executed, result in:
   detecting an initiation gesture;
   starting a gesture recognition engine in response to detecting the initiation gesture;
   determining, using the gesture recognition engine, a hand posture in at least one image of a plurality of images;
   determining, using the gesture recognition engine, a hand trajectory in the plurality of images;
   determining, using the gesture recognition engine, a dynamic hand gesture in response to the hand posture and the hand trajectory;
   providing, using the gesture recognition engine, a user interface command in response to determining the dynamic hand gesture;
   wherein determining the hand trajectory comprises:
      determining a plurality of hue-saturation-depth (HSD) histograms; and
      tracking, using mean-shift analysis, a moving hand in response to the plurality of HSD histograms.

8. The non-transitory computer-readable storage medium of claim 7, wherein determining the hand posture comprises:
   detecting a hand in the at least one image;
   segmenting, in response to detecting the hand, the at least one image into a binary image including a hand region; and
   determining at least one shape feature in the hand region.

9. The non-transitory computer-readable storage medium of claim 8, wherein the a least one shape feature comprises at least one of eccentricity, compactness, orientation, rectangularity, width center, height center, minimum box angle, minimum box width, number of defects, difference between left and right portions, or difference between top and bottom portions shape features.

10. The non-transitory computer-readable storage medium of claim 8, wherein detecting the hand comprises using a cascade speeded-up robust feature (SURF) detector to detect the hand.

11. The non-transitory computer-readable storage medium of claim 7, wherein determining the dynamic hand gesture comprises applying a hidden-markov model (HMM) to identify the dynamic hand gesture.

12. An apparatus, comprising:
   a processor configured to:
      detect an initiation gesture;
      start a gesture recognition engine in response to detecting the initiation gesture;
      determine, using the gesture recognition engine, a hand posture in at least one image of a plurality of images;
      determine, using the gesture recognition engine, a hand trajectory in the plurality of images;
      determine, using the gesture recognition engine, a dynamic hand gesture in response to the hand posture and the hand trajectory; and provide, using the gesture recognition engine, a user interface command in response to determining the dynamic hand gesture;

wherein to determine the hand trajectory the processor is configured to:
  determine a plurality of hue-saturation-depth (HSD) histograms; and
  track, using mean-shift analysis, a moving hand in response to the plurality of HSD histograms.

13. The apparatus of claim 12, wherein to determine the hand posture the processor is configured to:
  detect a hand in the at least one image;
  segment, in response to detecting the hand, the at least one image into a binary image including a hand region; and
  determine at least one shape feature in the hand region.

14. The apparatus of claim 13, wherein the a least one shape feature comprises at least one of eccentricity, compactness, orientation, rectangularity, width center, height center, minimum box angle, minimum box width, number of defects, difference between left and right portions, or difference between top and bottom portions shape features.

15. The apparatus of claim 13, wherein to detect the hand the processor is configured to use a cascade speeded-up robust feature (SURF) detector.

16. The apparatus of claim 12, wherein to determine the dynamic hand gesture the processor is configured to apply a hidden-markov model (HMM).

17. A system comprising:
an imaging device; and
a computing system, wherein the computing system is communicatively coupled to the imaging device and wherein, in response to depth images received from the imaging device, the computing system is to:
  detect an initiation gesture;
  start a gesture recognition engine in response to detecting the initiation gesture;
  determine, using the gesture recognition engine, a hand posture in at least one image of a plurality of images;
  determine, using the gesture recognition engine, a hand trajectory in the plurality of images;
  determine, using the gesture recognition engine, a dynamic hand gesture in response to the hand posture and the hand trajectory;
  provide, using the gesture recognition engine, a user interface command in response to determining the dynamic hand gesture;
wherein to determine the hand trajectory the computing system is to:
  determine a plurality of hue-saturation-depth (HSD) histograms; and
  track, using mean-shift analysis, a moving hand in response to the plurality of HSD histograms.

18. The system of claim 17, wherein to determine the hand posture the computing system is to:
  detect a hand in the at least one image;
  segment, in response to detecting the hand, the at least one image into a binary image including a hand region; and
  determine at least one shape feature in the hand region.

19. The system of claim 18, wherein the a least one shape feature comprises at least one of eccentricity, compactness, orientation, rectangularity, width center, height center, minimum box angle, minimum box width, number of defects, difference between left and right portions, or difference between top and bottom portions shape features.

20. The system of claim 18, wherein to detect the hand the computing system is to use a cascade speeded-up robust feature (SURF) detector.

21. The system of claim 17, wherein to determine the dynamic hand gesture the computing system is to apply a hidden-markov model (HMM).

* * * * *